United States Patent [19]

Yoshimura

[11] Patent Number: 4,956,731
[45] Date of Patent: Sep. 11, 1990

[54] TAPE FEEDING DIRECTION CONTROLLING DEVICE FOR AUTOMATIC REVERSING TAPE RECORDER

[75] Inventor: Toshio Yoshimura, Kawasaki, Japan
[73] Assignee: Tanashin Denki Co., Ltd., Tokyo, Japan
[21] Appl. No.: 326,002
[22] Filed: Mar. 20, 1989
[30] Foreign Application Priority Data Jun. 2, 1988 [JP] Japan .............................. 63-73479[U]

[51] Int. Cl.$^5$ ............................................. G11B 15/00
[52] U.S. Cl. ................................. 360/96.3; 360/74.1; 242/199
[58] Field of Search ............... 360/137, 74.1, 71, 96.3, 360/96.4, 105; 242/197-200

[56] References Cited

U.S. PATENT DOCUMENTS 4,620,242 10/1986 Takahashi ......................... 360/74.1

Primary Examiner—A. J. Heinz
Attorney, Agent, or Firm—Wegner & Bretschneider

[57] ABSTRACT

A tape feeding direction controlling device for an automatic reversing tape recorder wherein operation of a first or a second high speed operating member during a reproducing operation will cause high speed feeding of a tape in the same or in the opposite direction. The tape feeding direction controlling device comprises a feeding direction controlling member, a high speed changeover member, and a pivotal member connected to be bodily moved by the feeding direction controlling member. Depending upon whether the pivotal member is at its first or second position, it is pivoted in opposite directions by the first or second high speed operating member, and pivotal motion of the pivotal member in one or the other direction moves the high speed changeover member from its neutral position to a first or a second position in which it causes a tape feeding mechanism to feed a tape at a high speed in one or the other direction.

4 Claims, 12 Drawing Sheets

TAPE FEEDING DIRECTION CONTROLLING DEVICE FOR AUTOMATIC REVERSING TAPE RECORDER

BACKGROUND OF THE INVENTION

1. Field of the Invention

This invention relates to a tape feeding direction controlling device for an automatic reversing tape recorder, and more particularly to a tape feeding direction controlling device for an automatic reversing tape recorder including two rotation transmitting routes for a normal speed and a high speed, wherein a mechanism is simplified which causes a first or a second high speed operating member to indicate, when alternatively operated during a reproducing operation, a direction same as or reverse to the current tape feeding direction during the reproducing operation.

2. Description of the Prior Art

Manners of change-over between FF (fast feeding) and REW (rewinding) of automatic reversing tape recorders are generally divided into the following two types.

According to a first one of the types, first and second high speed operating members and a pair of reel receivers are provided in a one by one corresponding relationship, and in whichever direction a tape is fed during reproducing operation, when the first high speed operating member is manually operated, one of the reel receivers is driven to rotate at a high speed to feed the tape in a predetermined one direction. On the contrary, when the second high speed operating member is manually operated, the other reel receiver is driven to rotate at a high speed to feed the tape in the other direction.

According to the other type, first and second high speed operating members are provided in a predetermined relationship to a current tape feeding direction during a reproducing operation. In particular, when the first high speed operating member is manually operated during a reproducing operation, a tape is thereafter fed at a high speed in a direction same as the direction in which the tape has been fed during the reproducing operation. But, on the contrary when the second high speed operating member is manually operated, a tape is fed at a high speed in a direction reverse to the direction in which the tape has been fed during the reproducing operation.

With a tape recorder of the former type, when it is intended, for example, to make high speed feeding of a tape in the same direction as the current tape feeding direction during a reproducing operation, unless the current tape feeding direction is not confirmed, it cannot be discriminated which one of the high speed operating members should be operated. Accordingly, it is necessary to clearly indicate the current tape feeding direction.

To the contrary, the latter type is advantageous in that, even if the current tape feeding direction is not confirmed, operation of the first one of the high speed operating members will result in high speed feeding in the same direction as the current tape feeding direction and operation of the other or second high speed operating member will result in high speed feeding in a direction reverse to the current tape feeding direction. Accordingly, the high speed operating members can be alternatively operated even by groping.

Tape recorders of the latter type are disclosed, for example, in Japanese Patent Publication No. 50-14886 and Japanese Utility Model Laid-Open No. 62-142739. The conventional tape recorders, however, have the following drawbacks.

In particular, the thus disclosed tape recorders have such a common construction that, during reproducing operation, a capstan is rotated at a fixed speed so that a tape may be fed in an alternatively fixed direction while a reel receiver is rotated at such a rotational speed that the tape may be wound at a speed a little higher than the tape feeding speed which is determined by the capstan with a slip mechanism interposed in a rotation transmitting route from a motor to the reel receiver for absorbing an excessive rotational speed of the reel receiver. In a tape recorder of the type mentioned, a suitable tension is applied to a tape between the capstan and a winding side reel to prevent slackening of the tape. In order to allow the tape to be wound at a high speed, however, a pinch roller may be moved away from the capstan.

Also a tape recorder of another type is conventionally known wherein high speed feeding of a tape is achieved only by operation of a high speed operating member to move a pinch roller away from a capstan. The tape recorders disclosed in the two prior art documents mentioned hereinabove belong to the specific type.

With a tape recorder of the type wherein high speed feeding of a tape is achieved only by moving a capstan away from a pinch roller, however, there is a defect that the tape feeding speed upon high speed feeding cannot be raised very high.

Also a tape recorder is known wherein the rotational speed of a motor is raised in response to manual operation of a high speed operating member. The tape recorder, however, has a drawback that a motor controlling circuit therefor is complicated.

It is also a common practice as a countermeasure for the problem just described to prepare two rotation transmitting routes from a motor to a reel receiver for a normal speed and a high speed and change over an effective rotation transmitting route from the rotation transmitting route for the normal speed to the rotation transmitting route for the high speed in response to manual operation of the high speed operating member.

With an automatic reversing tape recorder of the type which includes two rotation transmitting routes for a normal speed and a high speed, however, if it is attempted to make up a mechanism wherein alternative operation of a first or a second high speed operating member will cause a tape to be fed at a high speed in a direction same as or reverse to the current tape feeding direction during a reproducing operation, the mechanism will be complicated in construction remarkably.

SUMMARY OF THE INVENTION

It is an object of the present invention to provide a tape feeding direction controlling device for an automatic reversing tape recorder including two rotation transmitting routes for a normal speed and a high speed, which includes a simplified mechanism which causes a first or a second high speed operating member to indicate, when alternatively operated during a reproducing operation, a direction same as or reverse to the current tape feeding direction during the reproducing operation.

It is another object of the present invention to provide a tape feeding direction controlling device for an automatic reversing tape recorder wherein simultaneous operation of first and second high speed operating members will cause reversal of the tape feeding direction during a reproducing operation.

In order to attain the objects, according to the present invention, there is provided a tape feeding direction controlling device for an automatic reversing tape recorder which includes a tape feeding mechanism for alternatively feeding a tape at a normal or a high speed in a first or a second direction and an automatic reversing mechanism which operates when a tape is fed to its last end, which comprises a feeding direction controlling member movable between first and second positions for determining a tape feeding direction in which a tape is to be fed by the tape feeding mechanism, the feeding direction controlling member being alternatively moved from the first to the second position or from the second to the first position in response to operation of the automatic reversing mechanism to reverse the tape feeding direction, first and second high speed operating members provided for individual manual operation, a high speed change-over member having a neutral position and first and second positions for causing the tape feeding mechanism to alternatively feed a tape at the high speed in the first or second direction, and a pivotal member positioned for engagement by the first and second high speed operating members and connected to be bodily moved between first and second positions in response to movement of the feeding direction controlling member between the first and second positions, the pivotal member being connected to the high speed change-over member such that, when the pivotal member is at the first position, manual operation of the first high speed operating member will pivot the pivotal member in a first direction to move the high speed change-over member from the neutral position to the first position, but manual operation of the second high speed operating member will pivot the pivotal member in the opposite second direction to move the high speed change-over member from the neutral position to the second position, and when the pivotal member is at the second position, manual operation of the second high speed operating member will pivot the pivotal member in the first direction to move the high speed change-over member to the first position, but manual operation of the first high speed operating member will pivot the pivotal member in the second direction to move the high speed change-over member to the second position.

With the tape feeding direction controlling device for an automatic reversing tape recorder, when the pivotal member at the first position is acted upon and pivoted in one direction by advancing force of the first high speed operating member, the high speed change-over member is moved to the first position in which the tape feeding mechanism feeds a tape at a high speed in the first direction. To the contrary, when the pivotal member at the first position is acted upon and pivoted in the other direction by advancing force of the second high speed operating member, the high speed change-over member is moved to the second position in which the tape feeding mechanism feeds a tape at a high speed in the second direction.

On the other hand, when the pivotal member at the second position is pivoted in the one direction by the second high speed operating member, the high speed change-over member is moved to the first position. To the contrary, when the pivotal member at the second position is pivoted in the other direction by the first high speed operating member, the high speed change-over member is moved to the second position.

Accordingly, if the first high speed operating member is operated during a reproducing operation, then a tape will be subsequently fed in the same direction but at a high speed. To the contrary, if the second high speed operating member is operated during a reproducing operation, then a tape will be subsequently fed in the opposite direction at a high speed.

Preferably, each of the first and second high speed operating members has first and second pressing portions while the pivotal member has a first pressure receiving portion at one end thereof and a second pressure receiving portion at the other end thereof, and when the pivotal member is at the first position, the first pressure receiving portion thereof is positioned on a path of advancement of the first pressing portion of the first high speed operating member while the second pressure receiving portion thereof is positioned on a path of advancement of the second pressing portion of the second high speed operating member, but when the pivotal member is at the second position, the first pressure receiving portion thereof is positioned on a path of advancement of the first pressure receiving portion of the second high speed operating member while the second pressure receiving portion thereof is positioned on a path of advancement of the second pressing portion of the first high speed operating member.

The tape feeding direction controlling device may further comprise a reversing member normally biased in one direction by a spring and inhibited from moving in the one direction by stopper portions provided on the first and second high speed operating members, whereby, as the first and second high speed operating members are advanced at the same time until the stopper portions thereof are disengaged from the reversing member, the reversing member is moved in the one direction to activate the automatic reversing mechanism. When it is thus intended, during a reproducing operation, to reverse the tape feeding direction to continue the reproducing operation, the first and second high speed operating members should be manually advanced at the same time.

The tape feeding direction controlling device may further comprise a pivotal lever supported for pivotal motion around a fixed axis and interconnecting the feeding direction controlling member and the pivotal member such that, when the feeding direction controlling member is moved between the first and second positions, the pivotal member is bodily moved between the first and second positions thereof in a direction different from the direction of movement of the feeding direction controlling member. Provision of the pivotal lever will facilitate designing in configuration of the tape feeding direction controlling device in a tape recorder of the automatic reversing type.

The above and other objects, features and advantages of the present invention will become apparent from the following description and the appended claims, taken in conjunction with the accompanying drawing.

DECRIPTION OF THE PREFERRED EMBODIMENT

Figure 1:
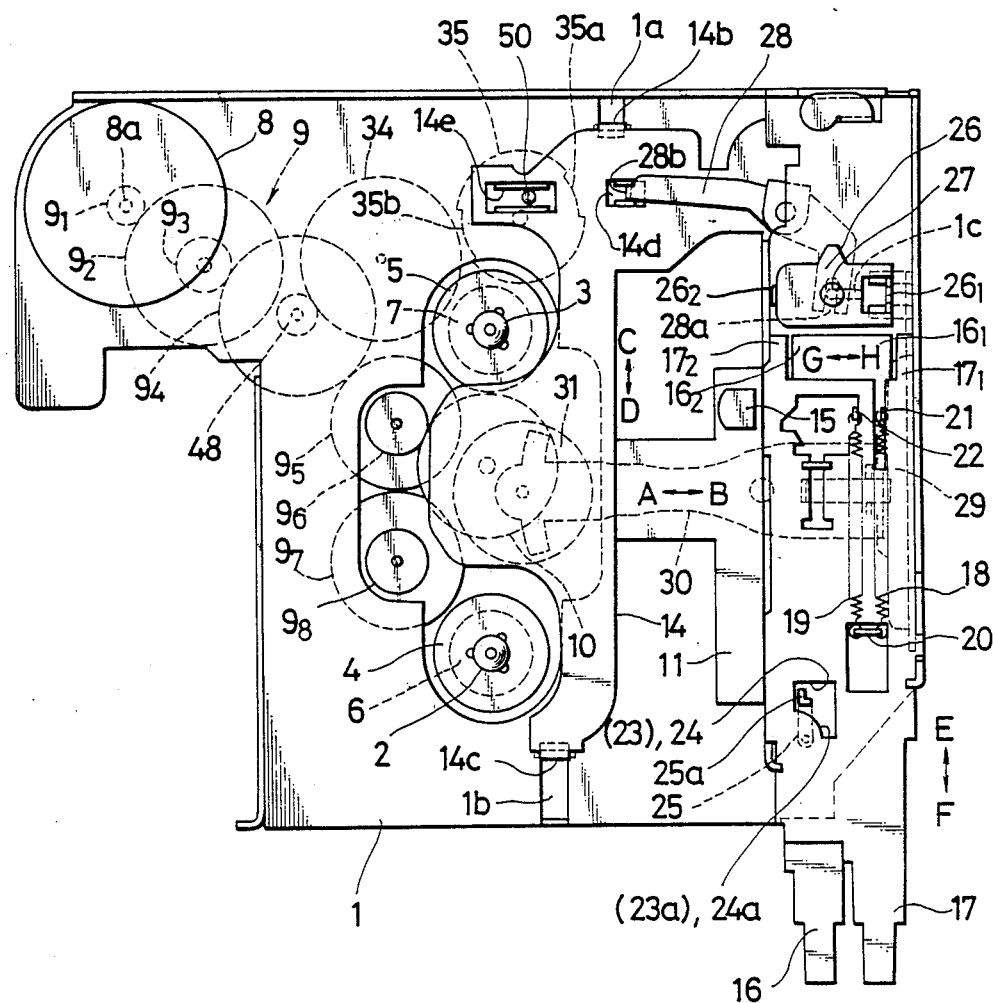
FIG. 1 is a plan view of a mechanism of a tape recorder in which a tape feeding direction controlling device according to the present invention is incorporated.

Referring first to FIG. 1, there is shown in plan a tape recorder in which a tape feeding direction controlling device according to the present invention is incorporated. The tape recorder shown includes a chassis 1, and a pair of reel receivers 2 and 3 mounted for rotation at substantially central locations of the chassis 1. A pair of fixed speed rotation reel gears 4 and 5 for normal speed tape feeding and a pair of high speed rotation reel gears 6 and 7 for high speed tape feeding are secured to lower end portions of the reel receivers 2 and 3, respectively. It is to be noted that, in FIG. 1 as well as in FIGS. 5(A) to 10, all gears or like members are indicated by mere circles of sizes corresponding to pitch circles of such gears or the like for the object of simplificatio of illustration.

Turning force of a motor 8 is alternatively transmitted to the reel receiver 2 or 3 by way of a power transmitting mechanism 9, a feeding direction change-over gear 10 and the fixed speed rotation reel gear 4 or 5. The motor 8 is secured to an upper face of a corner of the chassis 1. The power transmitting mechanism 9 is provided on a lower face of the chassis 1 and composed of a first gear $9_1$ secured to a rotary shaft $8a$ of the motor 8, a second gear $9_2$ held in meshing engagement with the first gear $9_1$, a third gear $9_3$ provided for concentrical integral rotation on the second gear $9_2$, a fourth gear $9_4$ held in meshing engagement with the third gear $9_3$, a fifth gear $9_5$ held in meshing engagement with the fourth gear $9_4$, a sixth gear $9_6$ provided for concentrical integral rotation on the fifth gear $9_5$, a seventh gear $9_7$ held in meshing engagement with the fifth gear $9_5$, and an eighth gear $9_8$ provided for concentrical integral rotation on the seventh gear $9_7$.

The feeding direction change-over gear 10 is supported for rotation on a lower face of an end portion of a head mounting plate 11 by means of a shaft $10a$. The head mounting plate 11 is mounted on the upper face of the chassis 1 for movement within a predetermined range in the directions as indicated by a double-sided arrow mark A-B FIG. 2. The shaft $10a$ of the feeding direction change-over gear 10 extends upwardly to the upper side of the head mounting plate 11 through an elongated hole 12 perforated at an end portion of the head mounting plate 11. The shaft $10a$ can thus move within the range of the elongated hole 12 in a direction perpendicular to an axis of movement of the head mounting plate 11. An engaging member 13 is secured to an end portion of an upper extension of the shaft $10a$.

Though not shown, a pair of capstans and a pair of pinch rollers are disposed in a left and right symmetrical relationship on the chassis 1. When the head mounting plate 11 is advanced in the direction of the arrow mark A, one of the pinch rollers is alternatively contacted under pressure with the corresponding capstan, but when the head mounting plate 11 is retracted in the direction of the arrow mark B, both of the pinch rollers are retracted from the individual capstans.

The engaging member 13 has a pair of resilient arms $13a$ and $13b$ on the opposite ends thereof and is normally fitted in an engaging hole $14a$ perforated at a substantially central portion of a feeding direction controlling member 14. The feeding direction controlling member 14 is mounted on the upper face of the chassis 1 for movement within a predetermined range in leftward and rightward directions as indicated by a double-sided arrow mark C-D perpendicular to the axis of movement of the head mounting plate 11. The feeding direction controlling member 14 has a pair of engaging pieces $14b$ and $14c$ in the form of substantially T-shaped bent tabs formed on the opposite ends thereof. The engaging pieces $14b$ and $14c$ are engaged for sliding movement in a pair of elongated engaging holes $1a$ and $1b$ perforated in the chassis 1.

When the feeding direction controlling member 14 is moved in the leftward direction as indicated by the arrow mark D while the head mounting plate 11 remains at its advanced limit position in the direction of the arrow mark A, the resilient arm $13a$ of the engaging member 13 is engaged and pushed by a side edge of the engaging hole $14a$ of the feeding direction controlling member 14. Consequently, the feeding direction change-over gear 10 is moved into meshing engagement with the fixed speed rotation reel gear 4 of the reverse side reel receiver 2 and also with the eighth gear $9_8$ of the power transmitting mechanism 9. The reel receiver 2 is thus rotated at a fixed normal speed by the motor 8 by way of the power transmitting mechanism 9 so that a tape (not shown) may be fed at a normal speed in one direction. In the following description, the one direction in which the tape is fed from the reel receiver 3 side to the reel receiver 2 side may be referred to with the word "reverse", and the other direction may be referred to with the word "forward".

To the contrary, when the feeding direction controlling member 14 is moved in the rightward direction as indicated by the arrow mark C while the head mounting plate 11 remains at its advanced limit position, the other resilient arm $13b$ of the engaging member 13 is contacted and pushed by the opposing side edge of the engaging hole $14a$ of the feeding direction controlling member 14. Consequently, the feeding direction change-over gear 10 is moved similarly into meshing engagement with the fixed speed rotation reel gear 5 of the other forward side reel receiver 3 and the sixth gear $9_6$ of the power transmitting mechanism 9. The other reel receiver 3 is now rotated at a fixed normal speed by the motor 8 by way of the power transmitting mechanism 9. Upon movement of the feeding direction controlling member 14 in the rightward direction, the left pinch roller is moved away from the corresponding capstan while at the same time the right pinch roller is brought into pressure contact with the corresponding capstan. Consequently, the tape feeding direction is reversed.

The head mounting plate 11 has a magnetic head 15 mounted on an upper face thereof such that when the head mounting plate 11 is moved in the direction indicated by the arrow mark A or B, the magnetic head 15 is moved into or out of contact with a tape (not shown) within a tape cassette (not shown) loaded in position on the tape recorder. The magnetic head 15 is normally biased in an advancing direction as indicated by the arrow mark A by a spring not shown. The head mounting plate 11 is associated with a pair of first and second high speed operating members 16 and 17 such that the former may be moved upon movement of one of the latter.

The first and second high speed operating members 16 and 17 are mounted in a mutually overlapping relationship on the upper face of a front portion of the chassis 1 for back and forth movement within a predetermined range in directions parallel to the directions of movement of the feeding direction controlling member 14, that is, in the directions indicated by a double-sided arrow mark E-F in FIG. 1. The first and second high speed operating members 16 and 17 can be manually operated to alternatively move back and forth and are normally biased in their returning directions as indicated by the arrow mark F by return springs 18 and 19, respectively. The return springs 18 and 19 are anchored at one ends thereof to a spring anchoring portion 20 of the chassis 1 and at the other ends thereof to spring anchoring bent lugs 21 and 22 of the first and second high speed operating members 16 and 17, respectively. The first and second high speed operating members 16 and 17 have cam holes 23 and 24 perforated in a mutually coincident relationship therein.

A pivotal bail 25 is supported for pivotal motion on the upper face of the chassis 1 and has an upwardly bent engaging lug 25a which is normally held in engagement with arcuate cam faces 23a and 24a of the cam holes 23 and 24 of the first and second high speed operating members 16 and 17. When the first or second high speed operating member 16 or 17 is advanced in the direction of the arrow mark E, the pivotal bail 25 is pivoted in the clockwise direction in FIG. 1 through engagement of the engaging lug 25a with the cam face 23a or 24a of the cam hole 23 or 24. Upon clockwise pivotal motion of the pivotal bail 25, the head mounting plate 11 which is held in direct engagement with another downwardly bent engaging lug 25b of the pivotal bail 25 is pushed to move back in the direction of the arrow mark B against the biasing force of the spring not shown.

Figure 3:
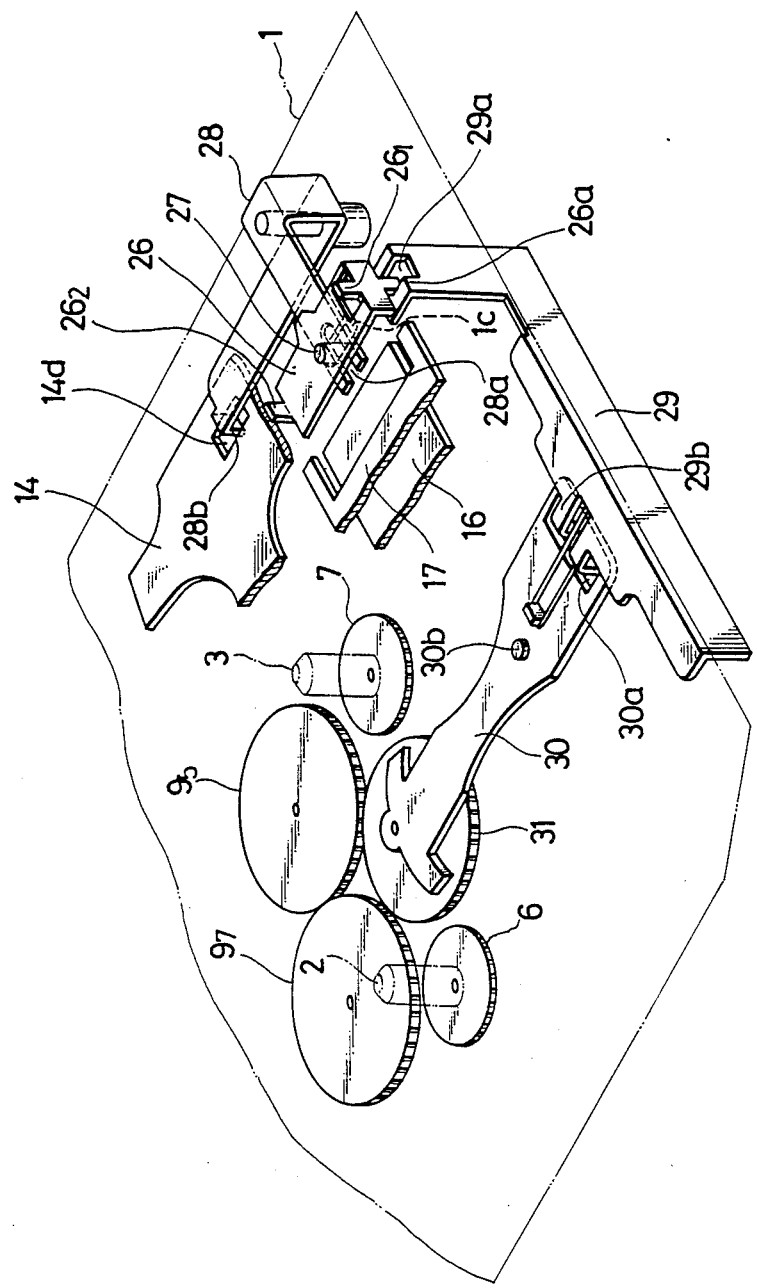
FIG. 3 is a perspective view, partly broken, of a high speed change-over mechanism of the device of FIG. 1.
Figure 4:
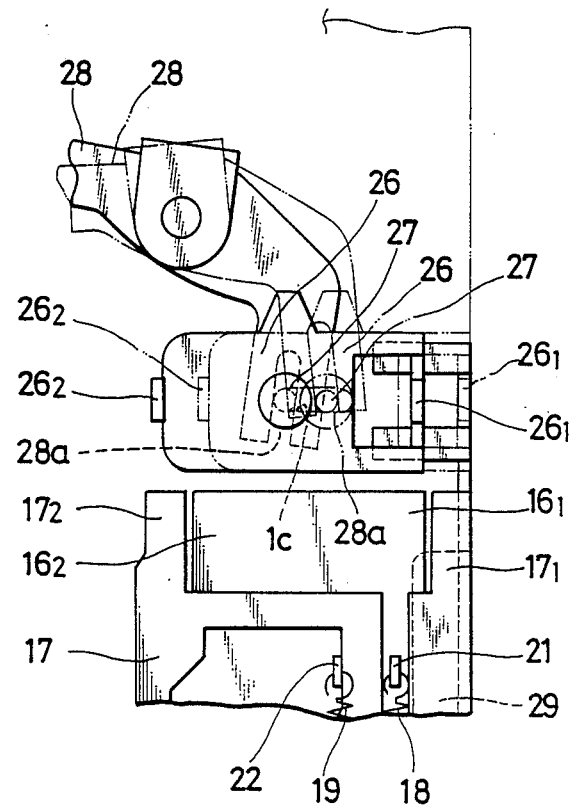
FIG. 4 is an enlarged plan view of a pivotal member of the device of FIG. 1.

Referring also to FIGS. 3 and 4, the first and second high speed operating members 16 and 17 have first pressing portions $16_1$ and $17_1$ at one sides of end portions thereof and second pressing portions $16_2$ and $17_2$ on the other sides of the end portions thereof, respectively. The first pressing portions $16_1$ and $17_1$ are located for engagement with a first pressure receiving portion $26_1$ in the form of an upwardly bent lug at an end of a pivotal member 26. To the contrary, the second pressing portions $16_2$ and $17_2$ are located for engagement with a second pressure receiving portion $26_2$ in the form of an upwardly bent lug at the other end of the pivotal member 26. The pivotal member 26 is mounted on the upper face of the chassis 1. The pivotal member 26 has a shaft 27 mounted on a lower face at a central portion thereof, and the shaft 27 is fitted for sliding movement and pivotal motion in an elongated hole 1c perforated in the chassis 1 and extends in the direction of the axis of movement of the head mounting plate 11.

Accordingly, the pivotal member 26 can move within the range of the elongated hole 1c in the same direction with the head mounting plate 11, that is, in the direction indicated by a double-sided arrow mark G-H in FIG. 1.

The pivotal member 26 is connected at a substantially central portion thereof to an end of the feeding direction controlling member 14 by way of a pivotal lever 28. The pivotal lever 28 is supported at a substantially central portion thereof for pivotal motion on the upper face of the chassis 1 and has an engaging hole 28a formed at an end thereof. The shaft 27 of the pivotal member 26 is received in the engaging hole 28a of the pivotal lever 28. The pivotal lever 28 has an engaging piece 28b in the form of a downwardly bent lug formed at the other end thereof, and the engaging piece 28b is engaged in a second engaging hole 14d formed in the feeding direction controlling member 14. Thus, when the feeding the direction controlling member 14 is moved in the rightward direction as indicated by the arrow mark C, the pivotal lever 28 is pivoted in the clockwise direction in FIG. 1 to move the pivotal member 26 in the direction indicated by the arrow mark G to its limit or first position. On the contrary, when the feeding direction controlling member 14 is moved in the leftward direction as indicated by the arrow mark D, the pivotal member 26 is moved in the direction indicated by the arrow mark H to its limit or second position by way of the pivotal arm 28.

Referring to FIG. 3, the pivotal member 26 is connected at an end portion thereof to a high speed changeover member 30 by way of a connecting link 29. In particular, the pivotal member 26 has an engaging piece or tab 26a at an end thereof, and the engaging piece 26a is engaged in an engaging hole 29a formed at an end portion of the connecting link 29. The connecting link 29 is mounted for movement within a predetermined range in the same direction with the first and second high speed operating members 16 and 17 on a front edge of the chassis 1. The connecting link 29 has a pair of engaging pieces 29b in the form of downwardly bent lugs formed at a substantially central portion thereof, and the engaging pieces 29b are engaged in an engaging hole 30a formed at a front end portion of the high speed operating member 30. The high speed change-over member 30 is supported at a substantially central portion thereof for pivotal motion around a pivot 30b on a lower chassis (not shown) below the head mounting plate 11, and a high speed feeding gear 31 is supported for rotation on a lower face at the other end of the high speed change-over member 30.

When the pivotal member 26 is at the first position as shown by solid lines in FIG. 4, the first pressure receiving portion $26_1$ thereof is positioned on a path of advancement of the first pressing portion $16_1$ of the first high speed operating member 16 while the second pressure receiving portion $26_2$ thereof is positioned on a path of advancement of the second pressing portion $17_2$ of the second high speed operating member 17. To the contrary, when the pivotal member 26 is at the second position as shown by two-dot chain lines in FIG. 4, the first pressure receiving portion $26_1$ thereof is positioned on a path of advancement of the first pressing portion $17_1$ of the second high speed operating member 17 while the second pressure receiving portion $26_2$ thereof is positioned on a path of advancement of the second pressing portion $16_2$ of the first high speed operating member 16.

If the first high speed operating member 16 is advanced in the direction indicated by the arrow mark E when the pivotal member 26 is at its first position, the first pressure receiving portion $26_1$ of the pivotal member 26 is pushed by the first pressing portion $16_1$ of the first high speed operating member 16 to pivot the pivotal member 26 in the counterclockwise direction in FIG. 1. Upon such counterclockwise pivotal motion of the pivotal member 26, the high speed change-over member 30 is pivoted in the counterclockwise direction in FIG. 1 by way of the connecting link 29 so that the high speed feeding gear 31 is brought into meshing engagement with the high speed rotation reel gear 6 of the reel receiver 2 and also with the seventh gear $9_7$ of the power transmitting mechanism 9. Consequently, the reel receiver 2 is rotated at a high speed. To the contrary, if the second high speed operating member 17 is advanced in the direction indicated by the arrow mark E when the pivotal member 26 is in the first position, the second pressure receiving portion $26_2$ of the pivotal member 26 is pushed by the second pressing portion $17_2$ of the second high speed operating member 17 to pivot the pivotal member 26 in the other or clockwise direction in FIG. 1. Upon such clockwise pivotal motion of the pivotal member 26, the high speed change-over member 30 is pivoted in the clockwise direction in FIG. 1 by way of the connecting link 29 so that the high speed feeding gear 31 is brought into meshing engagement with the high speed rotation reel gear 7 of the other reel receiver 3 and the fifth gear $9_5$ of the power transmitting mechanism 9. Consequently, the other reel receiver 3 is rotated at a high speed.

On the other hand, if the second high speed operating member 17 is advanced in the direction indicated by the arrow mark E when the pivotal member 26 is at its second position, the first pressure receiving portion $26_1$ of the pivotal member 26 is pushed by the first pressing portion $17_1$ of the second high speed operating member 17 to pivot the pivotal member 26 in the counterclockwise direction in FIG. 1. Consequently, the high speed change-over member 30 is pivoted in the clockwise direction in FIG. 1, and the reel receiver 2 is thus rotated at a high speed in a similar manner as described above. To the contrary, if the first high speed operating member 16 is advanced in the direction of the arrow mark E when the pivotal member 26 is at its second position, the second pressure receiving portion $26_2$ of the pivotal member 26 is pushed by the second pressing portion $16_2$ of the first high speed operating member 16 to pivot the pivotal member 26 in the clockwise direction in FIG. 1. Consequently, the high speed change-over member 30 is pivoted in the clockwise direction in FIG. 1, and the reel receiver 3 is rotated at a high speed in a similar manner as described above.

Figure 6A:
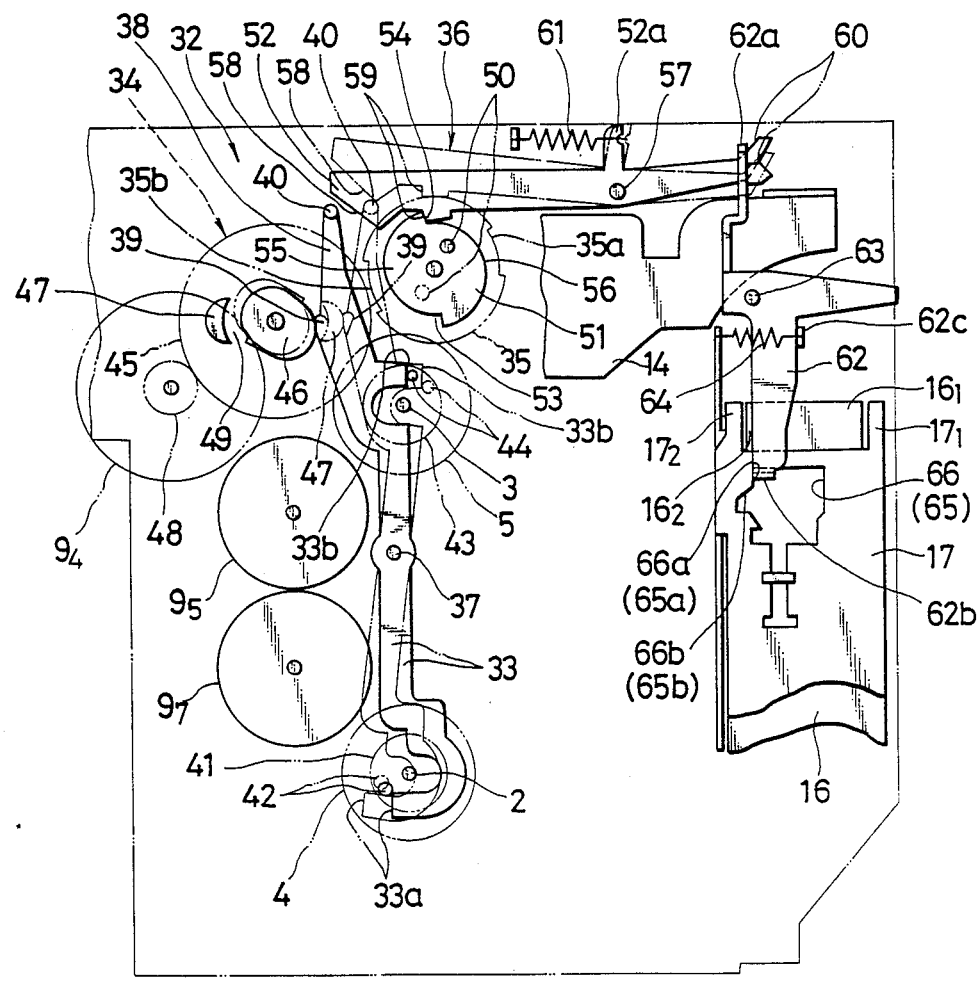
FIGS. 6(A) and 6(B) are plan views illustrating different positions of an automatic reversing mechanism of the device of FIG. 1.
Figure 6B:
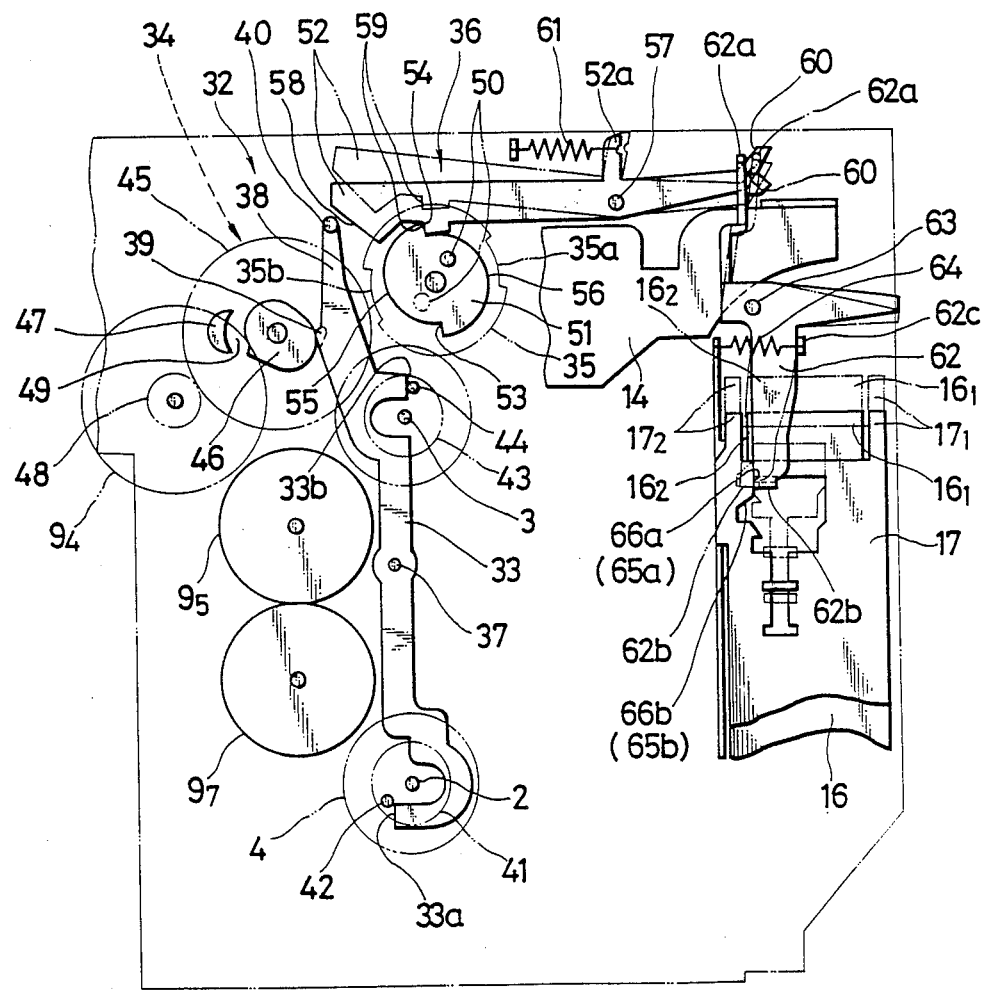

Referring to FIG. 6(A), an automatic reversing mechanism 32 is provided on the lower face of the chassis 1. The automatic reversing mechanism 32 includes a rocking plate 33, a cam gear 34, an intermittently toothed gear 35 and a trigger mechanism 36. The rocking plate 33 is mounted at a substantially central portion thereof for pivotal motion on the chassis 1 by means of a shaft 37 and has at the opposite ends thereof a pair of contacting faces 33a and 33b which are located adjacent the reel receivers 2 and 3, respectively, and directed in the opposite directions to each other. The rocking plate 33 has an extension 38 adjacent the contacting face 33b thereof, and the extension 38 has an engaging projection 39 formed on a side face of a substantially central portion thereof and another engaging projection 40 formed at a terminal end thereof.

A pin 42 is mounted on a rotary plate 41 of a friction mechanism interposed between the reel receiver 2 and the fixed speed rotation reel gear 4 and is positioned for engagement with the contacting face 33a of the rocking plate 33. Another pin 44 is mounted on a rotary plate 43 of another friction mechanism interposed between the other reel receiver 3 and the fixed speed rotation reel gear 5 and is positioned for engagement with the contacting face 33b at the other end of the rocking plate 33. When the rotary plate 41 or 43 is rotated in the counterclockwise direction in FIG. 6(A) together with the reel receiver 2 or 3, the pin 42 or 44 thereon is contacted with and pushes at the contacting face 33a or 33b of the rocking plate 33 to urge the rocking plate 33 to pivot in the counterclockwise direction in FIG. 6(A).

The cam gear 34 has a first substantially elliptic cam 46 and a second substantially crescent-shaped cam 47 formed on an axial end face of a gear body 45 thereof. The gear body 45 is normally held in meshing engagement with a gear 48 provided for coaxial integral rotation on the second gear $9_4$ of the power transmitting mechanism 9. The first cam 46 and the second cam 47 on the gear body 45 have cam faces positioned for sliding engagement with the first engaging projection 39 of the rocking plate 33.

When a magnetic tape not shown is being fed so that the rocking plate 33 is urged to pivot in the counterclockwise direction in FIG. 6(A), the first engaging projection 39 of the rocking plate 33 is pressed against and slides on the cam face of the first cam 46 passing along a path 49 between the first cam 46 and the second cam 47. Accordingly, while the cam gear 34 continues to be rotated, the rocking plate 33 is repetitively rocked around the shaft 38 within a range of the extent of eccentricity of the first cam 46, that is, between a first position defined by a smallest radius portion of the first cam 46 and a second position defined by a largest radius portion of the first cam 46. But when the tape is wound up to its last end to compulsorily stop rotation of the reel receiver 3 so that the two plate 41 and 43 are brought into a slipping condition with respect to the fixed speed rotation reel gears 4 and 5, respectively, the rocking plate 33 is no more urged by any of the pins 42 and 44, or in other words, the urging force to pivot the rocking plate 33 in the counterclockwise direction in FIG. 6(A) is canceled. As a result, when the cam gear 34 continues its rotation, the rocking plate 33 is first pivoted to the second position and then the first engaging projection 39 of the rocking plate 33 is soon brought into engagement with and slides on the cam face of the second cam 47 without passing along the path 49 whereupon the rocking plate 33 is compulsorily pivoted in the clockwise direction in FIG. 6(A) farther than the second position by the second cam 47. Thereupon, the second engaging projection 40 of the rocking plate 33 cancels a locked condition of the trigger mechanism 36.

The intermittently toothed gear 35 has a pair of non-toothed portions 35a and 35b at symmetrical locations of an outer periphery thereof circumferentially spaced by 180 degrees. Each time the intermittently toothed gear 35 is brought into meshing engagement with the gear body 45 of the cam gear 34, the gear 35 is intermittently rotated by 180 degrees in the clockwise direction in FIG. 6(A) by the cam gear 34. A pin 50 is mounted on an axial end face of the intermittently toothed gear 35 and normally held in engagement in a third engaging hole 14e formed in the feeding direction controlling member 14 as seen in FIG. 1. When the intermittently toothed gear 35 is rotated intermittently by about 180 degrees in the clockwise direction in FIG. 6(A), the feeding direction controlling member 14 is alternatively moved in the direction of the arrow mark C or D in FIG. 1 through engagement of the pin 50 in the third engaging hole 14e.

The trigger mechanism 36 includes a locking member 51 and a locking lever 52. The locking member 51 is provided in an integral relationship on the other axial end face of the intermittently toothed gear 35. The locking member 51 has a pair of engaging stepped portions 53 and 54 formed at symmetrical locations thereon circumferentially spaced by 180 degrees, and a pair of arcuate faces 55 and 56 interconnecting the engaging stepped portions 53 and 54. The locking lever 52 is mounted at a substantially central portion thereof for pivotal motion within a predetermined range on the chassis 1 by means of a shaft 57. The locking lever 52 has an inclined face 58 and an engaging projection 59 at an end portion thereof and has an inclined face 60 on the other end portion thereof.

When the locking lever 52 is at its counterclockwise limit position as shown by solid lines in FIG. 6(A), the engaging projection 59 thereof alternatively engages with the engaging stepped portion 53 or 54 of the locking member 51, and in this condition, the intermittently toothed gear 35 does not mesh with the gear body 45 of the cam gear 34 and rotation thereof is prohibited. Then, if the rocking plate 33 is pivoted in the clockwise direction to the clockwise limit position shown in phantom in FIG. 6(A), the second engaging projection 40 thereof is engaged with and pushes the inclined face 58 of the locking lever 52 to pivot the locking lever 52 in the clockwise direction to its clockwise limit position shown in phantom in FIG. 6(A) against the biasing force of a spring 61. Consequently, the engaging projection 59 of the locking lever 52 is disengaged from the engaging stepped portion 53 or 54 of the locking member 51 so that the intermittently toothed gear 35 is turned in the clockwise direction in FIG. 6(A) into meshing engagement with the gear body 45 of the cam gear 34 by the biasing force of a spring (not shown).

The spring 61 normally biases the locking lever 52 to pivot in the counterclockwise direction in FIG. 6(A) to engage the engaging projection 59 of the locking lever 52 with the engaging stepped portion 53 or 54 of the locking member 51. The spring 61 is anchored at an end thereof to a spring anchoring projection 52a of the locking lever 52 and at the other end thereof to the chassis 1. The inclined face 60 of the locking lever 52 is positioned for sliding engagement with an engaging hook 62a at an end of a reversing member 62. The reversing member 62 is mounted at a substantially central portion thereof for pivotal motion within a predetermined range on the chassis 1 by means of a shaft 63 and is normally biased to pivot in the clockwise direction in FIG. 6(A) by a spring 64. The spring 64 is anchored at an end thereof to a spring anchoring bent lug 62c of the reversing member 62 and at the other end thereof to the chassis 1. An engaging bent lug 62b is formed at the other end of the reversing member 62 and extends through a pair of mutually conforming engaging holes 65 and 66 formed in the first and second high speed operating members 16 and 17, respectively. The engaging holes 65 and 66 of the first and second high speed operating members 16 and 17 are partially defined by stopper faces 65a and 66a and inclined faces 65b and 66b, respectively.

When at least one of the first and second high speed operating members 16 and 17 is both at its home position returned in the direction indicated by the arrow mark F, the engaging bent lug 62b of the reversing member 62 contacts with the stopper face 65a or 66a of the engaging hole 65 or 66 to prevent pivotal motion of the reversing member 62 in the clockwise direction in FIG. 6(A) against the biasing force of the spring 64. To the contrary, when the first and second high speed operating members 16 and 17 are advanced at the same time in the direction indicated by the arrow mark E in FIG. 1, the engaging portion 62b of the reversing member 62 is disengaged from the stopper portions 65a and 66a of the engaging holes 65 and 66 and is slidably engaged with the inclined faces 65b and 66b. Consequently, the reversing member 62 is allowed to be pivoted in the clockwise direction in FIG. 6(A) by the biasing force of the spring 64. Upon such clockwise pivotal motion of the reversing member 62, the engaging portion 62a thereof pushes at the inclined face 60 of the locking lever 52 to pivot the locking lever 52 in the clockwise direction in FIG. 6(A) against the biasing force of the spring 61. Consequently, the engaging projection 59 of the locking lever 52 is disengaged from the engaging stepped portion 53 or 54 of the locking member 51 to allow the intermittently toothed gear 35 to be turned in the clockwise direction by the biasing force of the spring not shown.

Subsequently, operation of the tape feeding direction controlling device for an automatic reversing tape recorder having such a construction as decribed above will be described. In the condition shown in FIG. 1, the feeding direction controlling member 14 is at its limit position in the direction of the arrow mark C. Meanwhile, the first and second high speed operating members 16 and 17 are at their respective home or limit positions in the direction of the arrow mark F. Consequently, the head mounting plate 11 is at its advanced position in the direction of the arrow mark A wherein the magnetic head 15 contacts with a tape within a tape cassette (not shown) loaded in position on the reel receivers 2 and 3 and the pinch rollers (not shown) contact with the capstans (not shown either) with the tape interposed therebetween. Further, as the feeding direction controlling member 14 is at its limit position in the direction of the arrow mark C, the feeding direction change-over gear 10 meshes with the fixed speed rotation reel gear 5 of the reel receiver 3 and the sixth gear $9_6$ of the power transmitting mechanism 9. Accordingly, in the condition shown FIG. 1, the reel receiver 3 is rotated at a fixed speed to feed the tape at a normal speed from the reel receiver 2 side to the other reel receiver 3 side so that recording or reproducing operation is performed. Upon such operation, the automatic reversing mechanism 32 assumes such a position as shown by solid lines in FIG. 6(A). Then, when the tape is wound up to its last end to the reel receiver 3 side, the rocking plate 33 is pivoted in the clockwise direction by an action of the second cam 47 of the automatic reversing mechanism 32. Consequently, the locking lever 52 is pivoted in the clockwise direction against the biasing force of the spring 61 so that the engaging projection 59 thereof is disengaged from the engaging stepped portion 54 of the locking member 51 as shown by two-dot chain lines in FIG. 6(A). Consequently, the intermittently toothed gear 35 is rotated a little in the clockwise direction so that it is brought into meshing engagement with the gear body 45 of the cam gear 34. As a result, the intermittently toothed gear 35 is rotated by about 180 degrees in the clockwise direction from the position shown in FIG. 6(A) by the cam gear 35 until the other non-toothed portion 35a thereof is opposed to the gear body 45.

When the intermittently toothed gear 35 is rotated by about 180 degrees, the feeding direction controlling member 14 is moved in the direction of the arrow mark D in FIG. 1. Thereupon, the feeding direction changeover gear 10 is brought out of meshing engagement with the fixed speed rotation reel gear 5 of the reel receiver 3 and the sixth gear $9_6$ of the power transmitting mechanism 9 and now brought into meshing engagement with the fixed speed rotation reel gear 4 of the reel receiver 2 and the eighth gear $9_8$ of the power transmitting mechanism 9. Consequently, the reel receiver 2 is thereafter rotated at a fixed speed to feed the tape at a normal feeding speed now in the reverse direction from the reel receiver 3 side to the reel receiver 2 side to effect recording or reproducing operation.

After rotation of the reel receiver 2 is started, the rocking plate 33 is pushed at the contacting face 33a thereof by the pin 42 on the rotary plate 41 to pivot in the counterclockwise direction in FIG. 6(A) until the first engaging projection 39 thereof is contacted with the first cam 46 of the cam body 45. Thereupon, the locking lever 52 is pivoted in the counterclockwise direction back to the position shown by solid lines in FIG. 6(A) by the spring 61.

Figure 5A:
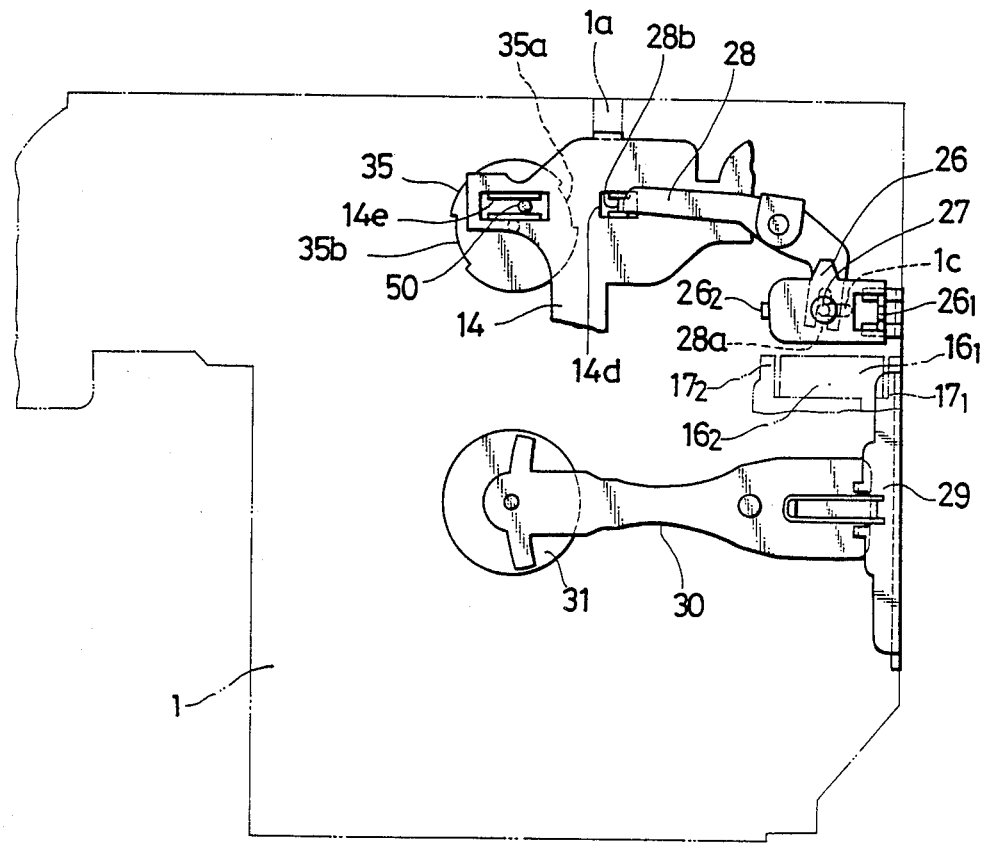
FIGS. 5(A) and 5(B) are plan views illustrating different positions of the pivotal member shown in FIG. 4.

Again, when the feeding direction controlling member 14 is at its limit position in the direction of the arrow mark C and the tape is being fed at the normal feeding speed from the reel receiver 2 side to the reel receiver 3 side as shown in FIG. 1, the pivotal member 26 is at its first or limit position in the direction of the arrow mark G of FIG. 1 as particularly shown in FIG. 5(A).

Figure 2:
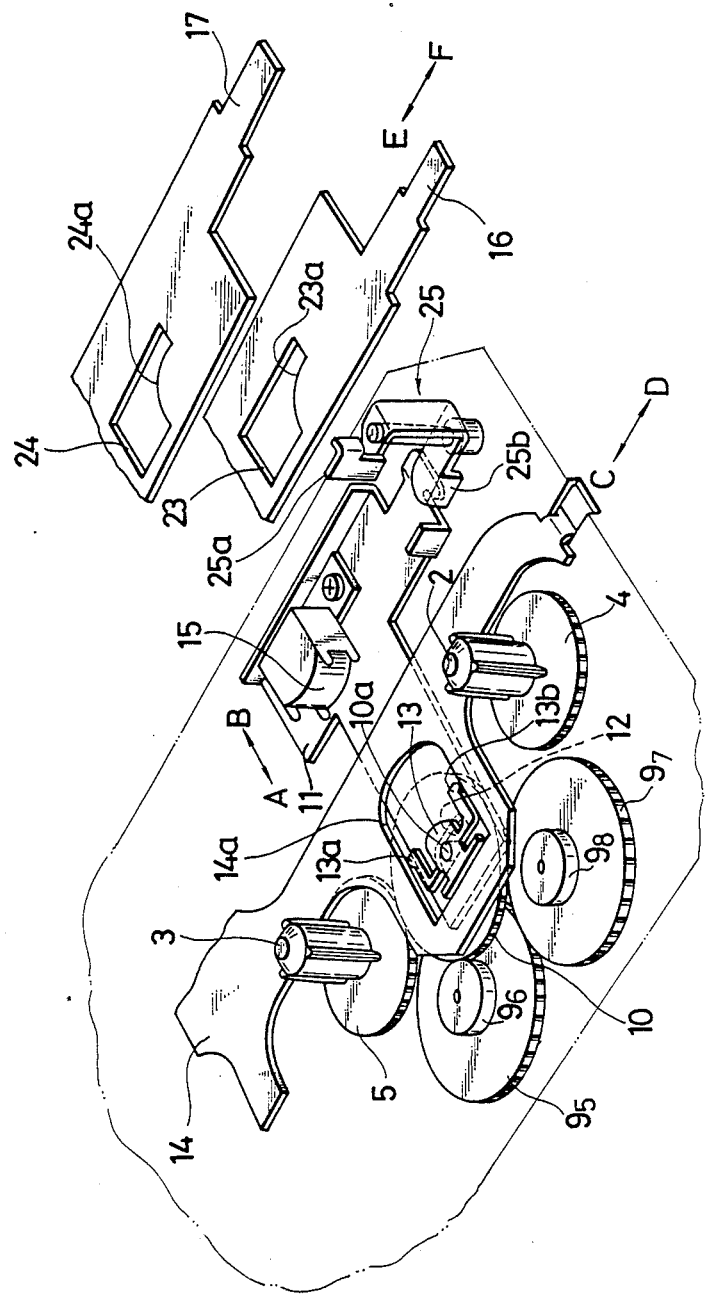
FIG. 2 is a perspective view, partly broken, of a feeding direction change-over mechanism of the tape feeding direction controlling device shown in FIG. 1.
Figure 7:
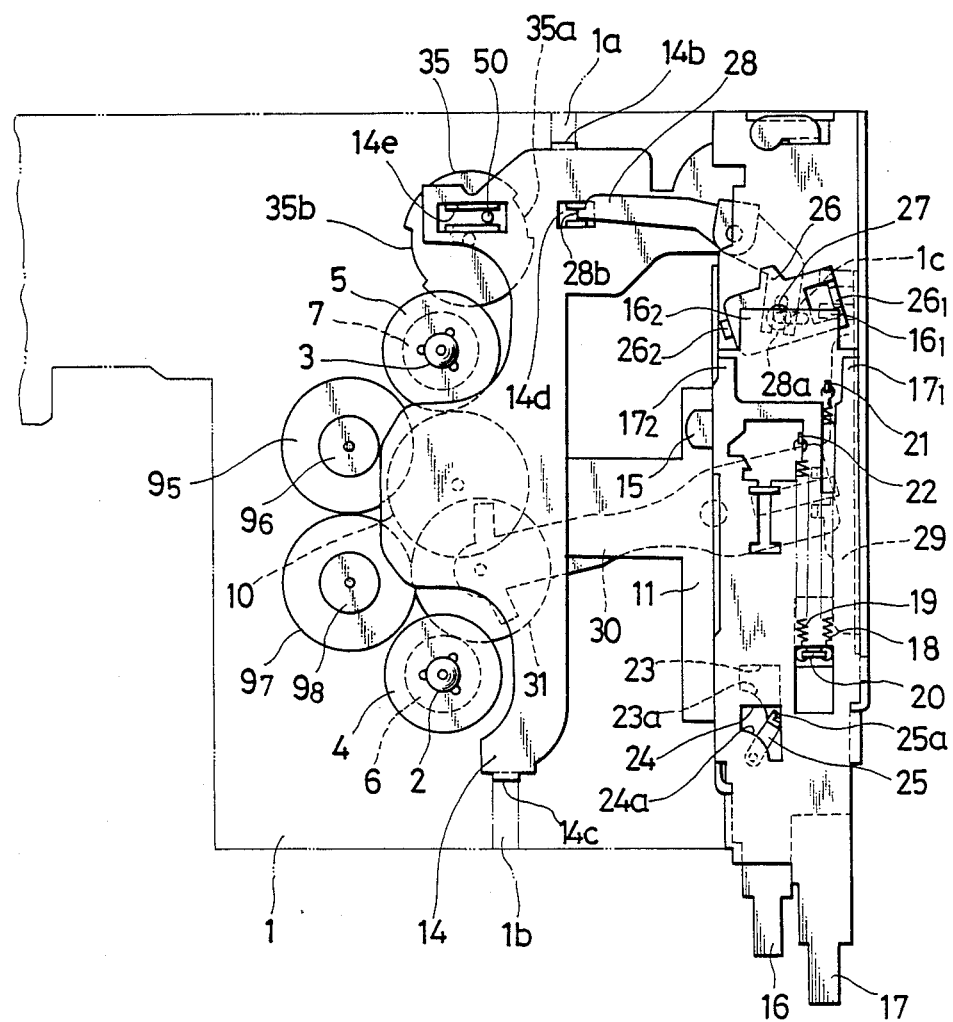
FIGS. 7 to 10 are plan views illustrating different positions of the tape feeding direction controlling device of FIG. 1.

In this condition, if only the first high speed operating member 16 is advanced in the direction of the arrow mark E in FIG. 1, the pivotal bail 25 is pivoted in the clockwise direction in FIG. 2 so that the head mounting plate 11 is moved in the direction of the arrow mark B. Thereupon, the magnetic head 15 and the pinch rollers are retracted from the tape and the capstans, respectively, and simultaneously the feeding direction changeover gear 10 is brought out of meshing engagement with the fixed speed rotation gear 5 of the reel receiver 3 and the sixth gear $9_6$ of the power transmitting mechanism 9. Further, upon such advancement of the first high speed operating member 16, the first pressing portion $16_1$ thereof pushes at the first pressure receiving portion $26_1$ of the pivotal member 26 to pivot the pivotal member 26 in the counterclockwise direction in FIG. 1. Consequently, the high speed change-over member 30 is pivoted in the counterclockwise direction in FIG. 1 by way of the connecting link 29 so that the high speed feeding gear 31 is brought into meshing engagement with the high speed rotation gear 6 of the reel receiver 2 and the seventh gear $9_7$ of the power transmitting mechanism 9. As a result, such a condition as seen in FIG. 7 is reached wherein the reel receiver 2 is rotated at a high speed and the tape is fed at a high speed from the reel receiver 3 side to the reel receiver 2 side.

Figure 8:
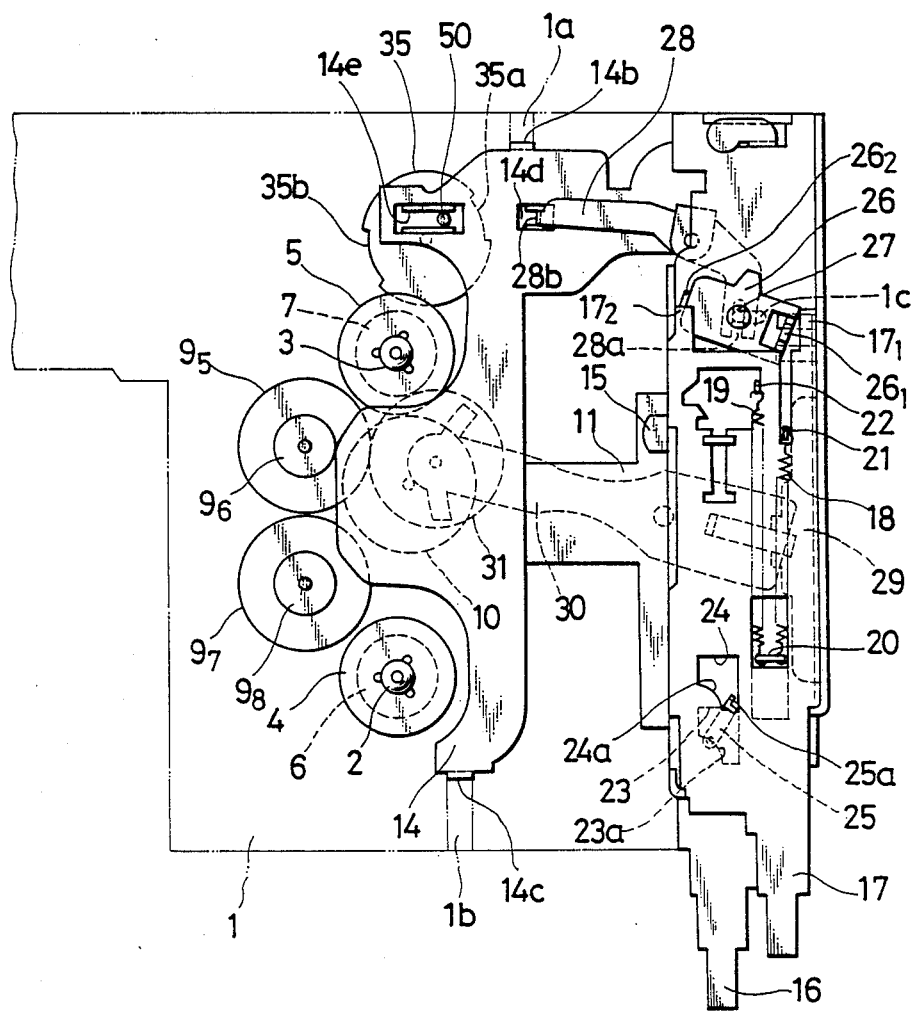

To the contrary, if only the second high speed operating member 17 is advanced in the direction of the arrow mark E when the pivotal member 26 is at its first position as shown in FIG. 1, the second pressing portion $17_2$ thereof pushes at the second pressure receiving portion $26_2$ of the pivotal member 26 to pivot the pivotal member 26 in the clockwise direction in FIG. 1. Upon such pivotal motion of the pivotal member 26, the high speed change-over member 30 is pivoted in the clockwise direction in FIG. 1 by way of the connecting link 29 so that the high speed feeding gear 31 is now brought into meshing engagement with the high speed rotation gear 7 of the reel receiver 3 and the fifth gear $5_5$ of the power transmitting mechanism 9 as seen in FIG. 8. Further, upon advancement of the second high speed operating member 17, the pivotal bail 25 is pivoted in the clockwise direction in FIG. 1 thereby to retract the magnetic head 15 and the pinch rollers from the tape and the capstans, respectively. Consequently, the reel receiver 3 is rotated at a high speed to feed the tape at a high speed now from the reel receiver 2 side to the reel receiver 3 side.

Figure 5B:
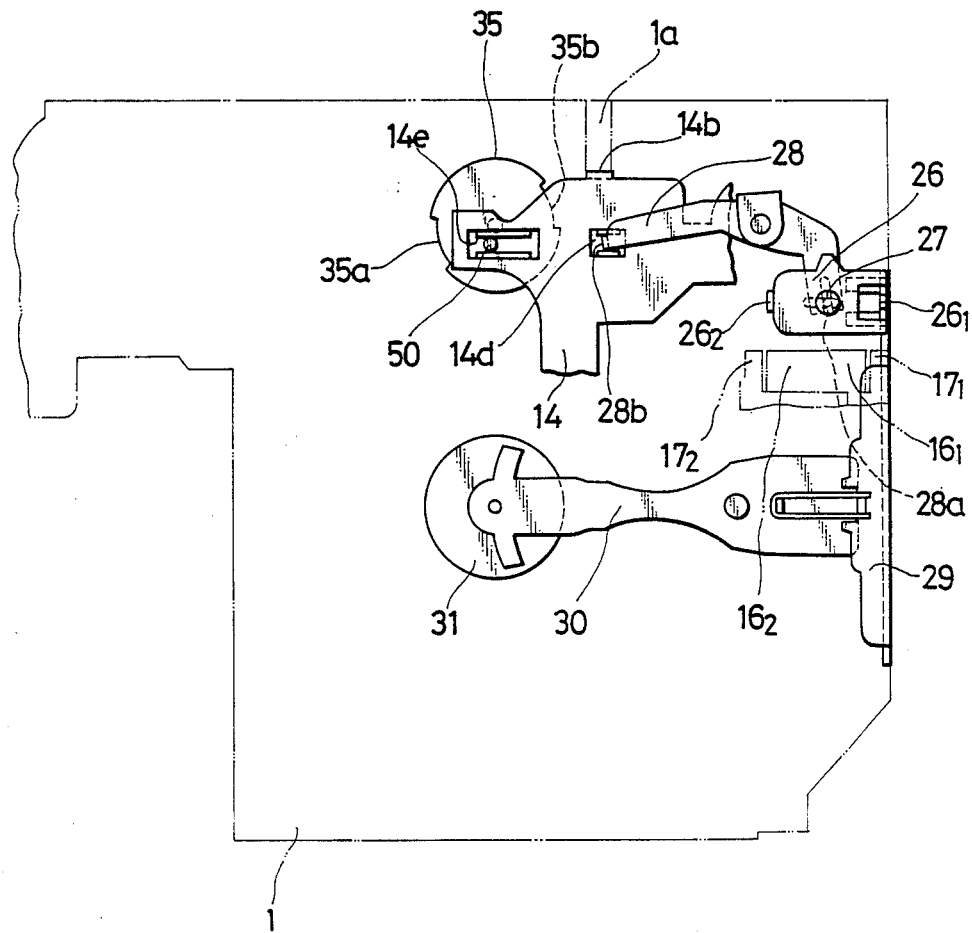
Figure 9:
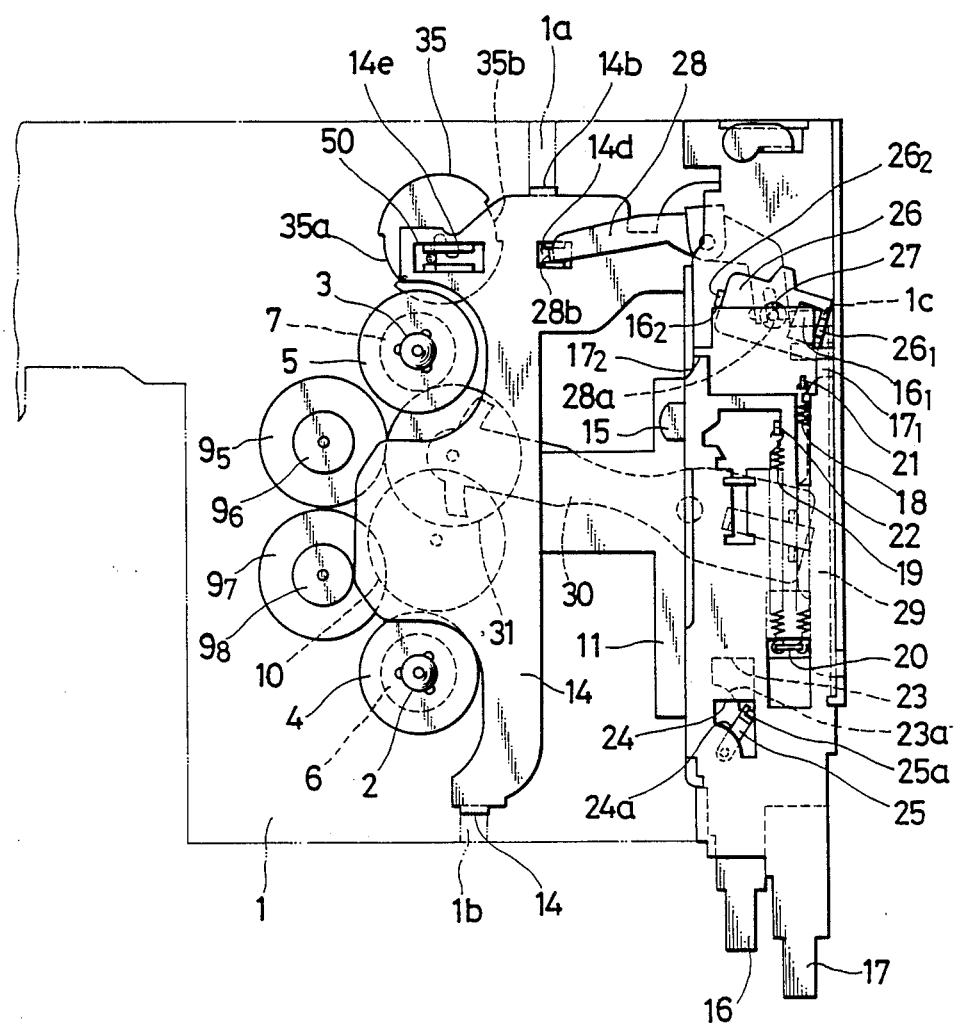

On the other hand, when the feeding direction controlling member 14 is at its limit position in the direction of the arrow mark D while the first and second high speed operating members 16 and 17 are at their respective home or limit positions in the direction of the arrow mark F and accordingly the tape is being fed at a normal feeding speed from the reel receiver 3 side to the reel receiver 2 side, the pivotal member 26 is at its second or limit position in the direction of the arrow mark H as shown in FIG. 5(B). In this condition, if the first high speed operating member 16 is advanced in the direction of the arrow mark E in FIG. 1, the second pressing portion $16_2$ thereof pushes at the second pressure receiving portion $26_2$ of the pivotal member 26 to pivot the pivotal member 26 in the clockwise direction to such a position as shown in FIG. 9. Consequently, the reel receiver 3 is rotated at a high speed in a similar manner as described hereinabove.

Figure 10:
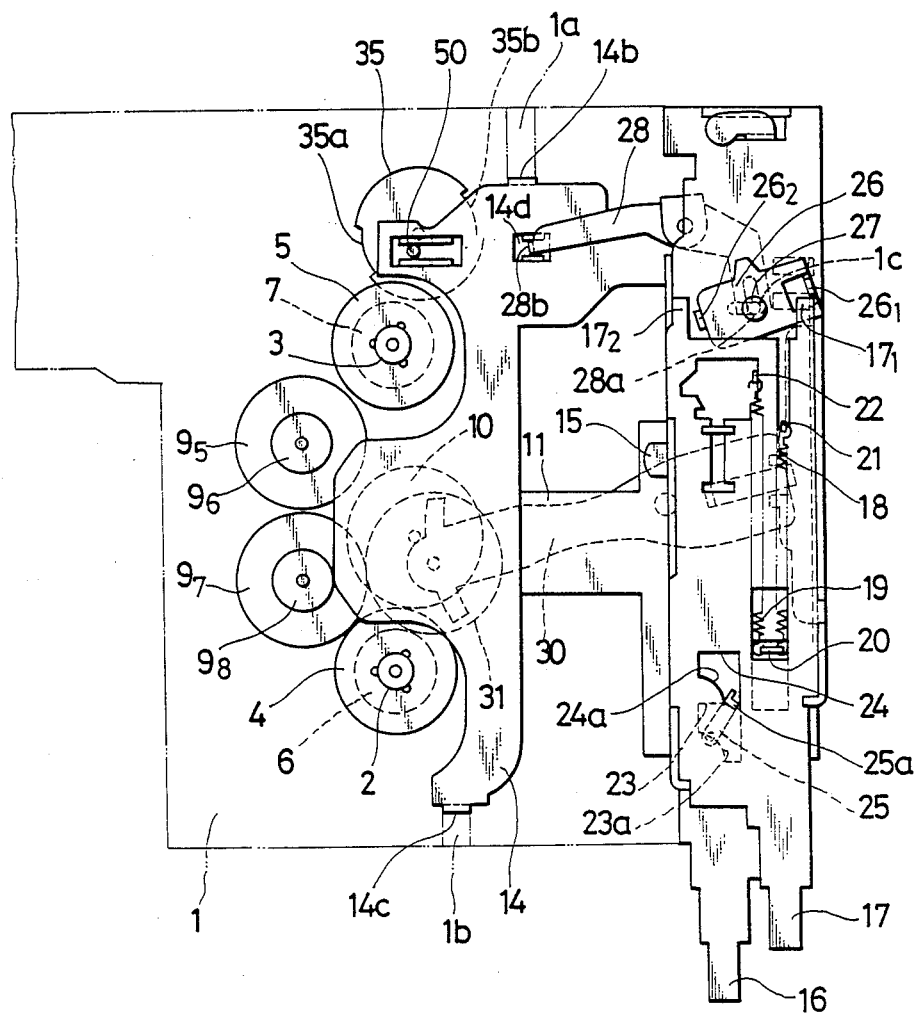

To the contrary, if only the second high speed operating member 17 is advanced in the direction of the arrow mark E in FIG. 1 when the pivotal member 26 is at its second position, the first pressing portion $17_1$ thereof pushes at the second pressure receiving portion $26_2$ of the pivotal member 26 to pivot the pivotal member 26 in the counterclockwise direction in FIG. 1 to a position shown in FIG. 10. Consequently, the reel receiver 2 is rotated at a high speed in a similar manner as described above.

When the tape is being fed at a normal feeding speed from the reel receiver 2 side to the reel receiver 3 side or in the opposite direction, the automatic reversing mechanism 32 assumes such a position as shown by solid lines in FIG. 6(A). In this condition, if the first and second high speed operating members 16 and 17 are advanced at the same time in the direction of the arrow mark E, the engaging portion 62b of the reversing member 62 is disengaged from the stopper portions 65a and 66a of the engaging holes 65 and 66 of the first and second high speed operating members 16 and 17. Consequently, the reversing member 62 is pivoted in the clockwise direction in FIG. 6(B) by the biasing force of the spring 64 and comes to a position shown in two-dot chain lines in FIG. 6(B). Upon such clockwise pivotal motion of the reversing member 62, the engaging portion 62a thereof pushes at the inclined face 60 at the forward end portion of the locking lever 52 to pivot the locking lever 52 in the clockwise direction in FIG. 6(B) against the biasing force of the spring 61. Consequently, the engaging projection 59 of the locking lever 52 is disengaged from the engaging stepped portion 53 or 54 of the locking member 51 to cancel the locked condition of the intermittently toothed gear 35. As a result, the intermittently toothed gear 35 is brought into meshing engagement with the gear body 45 of the cam gear 34 and rotated by about 180 degrees by the latter. Consequently, the feeding direction controlling member 14 is moved in the direction of the arrow mark C or D in a similar manner as described hereinabove, thereby reversing the tape feeding direction.

After then, when the pushing force upon the first and second high speed operating members 16 and 17 is canceled, they are returned in the direction of the arrow mark F to the home positions by the biasing force of the springs 18 and 19, respectively. Thereupon, the reversing member 62 is pivoted in the counterclockwise direction in FIG. 6(B) against the biasing force of the spring 64 through engagement of the engaging portion 62b thereof with the inclined faces 65b and 66b of the first and second high speed operating members 16 and 17. The locking lever 52 is thus allowed to be pivoted in the counterclockwise direction in FIG. 6(B) by the biasing force of the spring 61. Consequently, the engaging projection 59 of the locking lever 52 is engaged with the engaging stepped portion 53 or 54 of the locking member 51 to prohibit further rotation of the intermittently toothed gear 35.

What is claimed is:

1. A tape feeding direction controlling device for an automatic reversing tape recorder which includes a tape feeding mechanism for alternatively feeding a tape at a normal or a high speed in a first or a second direction and an automatic reversing mechanism which operates when a tape is fed to its last end, comprising a feeding direction controlling member movable between first and second positions for determining a tape feeding direction in which a tape is to be fed by said tape feeding mechanism, said feeding direction controlling member being alternatively moved from the first to the second position or from the second to the first position in response to operation of said automatic reversing mechanism to reverse the tape feeding direction, first and second high speed operating members provided for individual manual operation, a high speed change-over member having a neutral position and first and second positions for causing said tape feeding mechanism to alternatively feed a tape at the high speed in the first or second direction, and a pivotal member positioned for engagement by said first and second high speed operating members and connected to be bodily moved between first and second positions in response to movement of said feeding direction controlling member between the first and second positions, said pivotal member being connected to said high speed change-over member such that, when said pivotal member is at the first position, manual operation of said first high speed operating member will pivot said pivotal member in a first direction to move said high speed change-over member from the neutral position to the first position, but manual operation of said second high speed operating member will pivot said pivotal member in the opposite second direction to move said high speed change-over member from the neutral position to the second position, and when said pivotal member is at the second position, manual operation of said second high speed operating member will pivot said pivotal member in the first direction to move said high speed change-over member to the first position, but manual operation of said first high speed operating member will pivot said pivotal member in the second direction to move said high speed change-over member to the second position.

2. A tape feeding direction controlling device for an automatic reversing tape recorder as set forth in claim 1, wherein each of said first and second high speed operating members has first and second pressing portions while said pivotal member has a first pressure receiving portion at one end thereof and a second pressure receiving portion at the other end thereof, and when said pivotal member is at the first position, said first pressure receiving portion thereof is positioned on a path of advancement of said first pressing portion of said first high speed operating member while said second pressure receiving portion thereof is positioned on a path of advancement of said second pressing portion of said second high speed operating member, but when said pivotal member is at the second position, said first pressure receiving portion thereof is positioned on a path of advancement of said first pressure receiving portion of said second high speed operating member while said second pressure receiving portion thereof is positioned on a path of advancement of said second pressing portion of said first high speed operating member.

3. A tape feeding direction controlling device for an automatic reversing tape recorder as set forth in claim 1, further comprising a reversing member normally biased in one direction by a spring and inhibited from moving in the one direction by stopper portions provided on said first and second high speed operating members, whereby, as said first and second high speed operating members are advanced at the same time until said stopper portions thereof are disengaged from said reversing member, said reversing member is moved in the one direction to activate said automatic reversing mechanism.

4. A tape feeding direction controlling device for an automatic reversing tape recorder as set forth in claim 1, further comprising a pivotal lever supported for pivotal motion around a fixed axis and interconnecting said feeding direction controlling member and said pivotal member such that, when said feeding direction controlling member is moved between the first and second positions, said pivotal member is bodily moved between the first and second positions thereof in a direction different from the direction of movement of said feeding direction controlling member.

* * * * *